(12) United States Patent
Etemad

(10) Patent No.: US 6,404,524 B1
(45) Date of Patent: Jun. 11, 2002

(54) METHOD AND SYSTEM FOR SECURING WAVELENGTH DIVISION MULTIPLEX SYSTEMS

(75) Inventor: Shahab Etemad, Warren, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/438,003

(22) Filed: Nov. 10, 1999

Related U.S. Application Data
(60) Provisional application No. 60/108,127, filed on Nov. 12, 1998.

(51) Int. Cl.[7] .......................... H04B 10/00; H04B 10/08
(52) U.S. Cl. ..................... 359/124; 359/110; 359/112
(58) Field of Search .................... 359/124, 127, 359/128, 110, 115, 112, 125; 379/7

(56) References Cited

U.S. PATENT DOCUMENTS

| | | | |
|---|---|---|---|
| 3,737,584 A | | 6/1973 | Kaneko et al. .......... 179/15 BP |
| 4,573,205 A | * | 2/1986 | Nash ........................... 455/30 |
| 5,612,805 A | * | 3/1997 | Fevrier ....................... 359/124 |
| 5,923,667 A | | 7/1999 | Poiraud et al. ............. 370/515 |

OTHER PUBLICATIONS

"Data Communication via Chaotic Encoding and Associated Security Issues", Jaafar M. H. Elmirhani, Dept. of Electrica Electronic Engineering and Physics, University of Northumbria at Newcastle, Newcastle Upon Tyne, NE1 8ST, UK, IEEE 1995, pp. 1188–1192.

"Point–to–Point and Multi–User Communication Based on Chaotic Sequences", Jaafar M.H. Elmirghani and Robert A. Cryan, Dept. of Electrical, Electronic Engineering and Physics, University of Northumbria at Newcastle, UK, IEEE 1995, pp. 582–584.

"Communication using Chaotic Masking", J.M.H. Elmirghani and R. A. Cryan, Centre for Communication Networks Research, Department of Electrical and Electronic Engineering, The Manchester Metropolitan University, Chester St., Manchester, M1 5GD, UK, pp. 12/1—12/6.

* cited by examiner

*Primary Examiner*—Jason Chan
*Assistant Examiner*—Agustin Bello
(74) *Attorney, Agent, or Firm*—Orville R. Cockings

(57) ABSTRACT

A system and method for securing DWDM networks that includes adding background (e.g., white) noise to a level up to the larger of the cross-talk signal or the background channel noise (e.g., amplified spontaneous emission level). The system comprises a white noise generator appropriately placed so that any leaked signals are masked by the white noise generated. Accordingly, only signals intended to be dropped are recoverable because all other signals would not be recoverable from the background white noise.

9 Claims, 5 Drawing Sheets

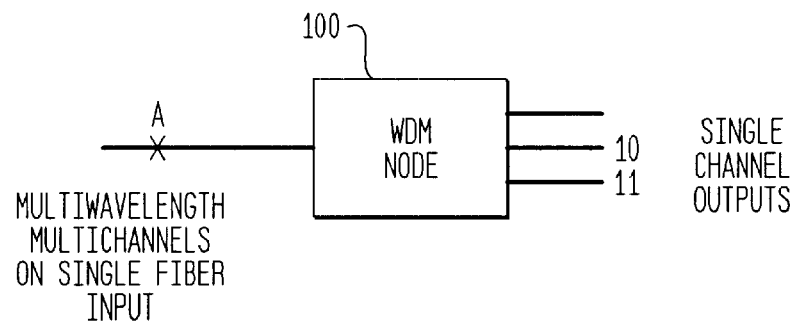
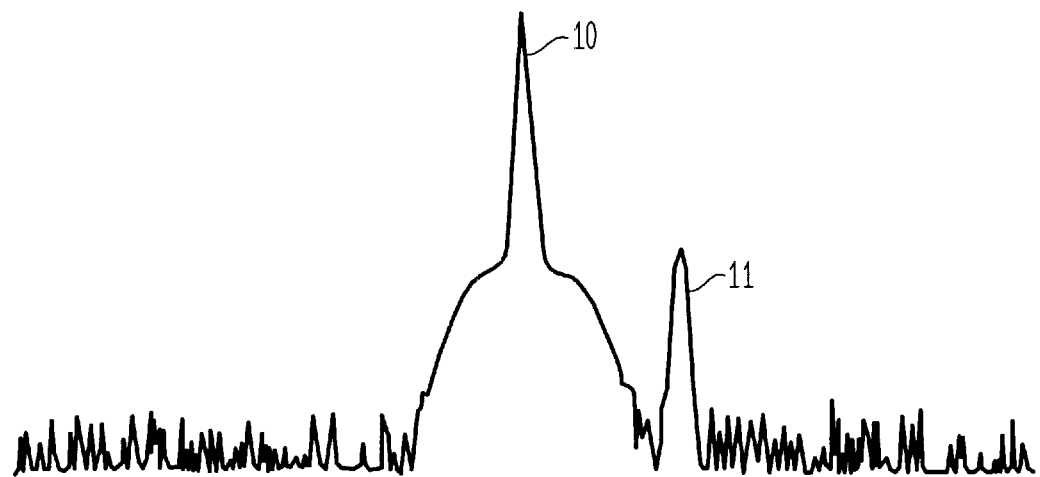

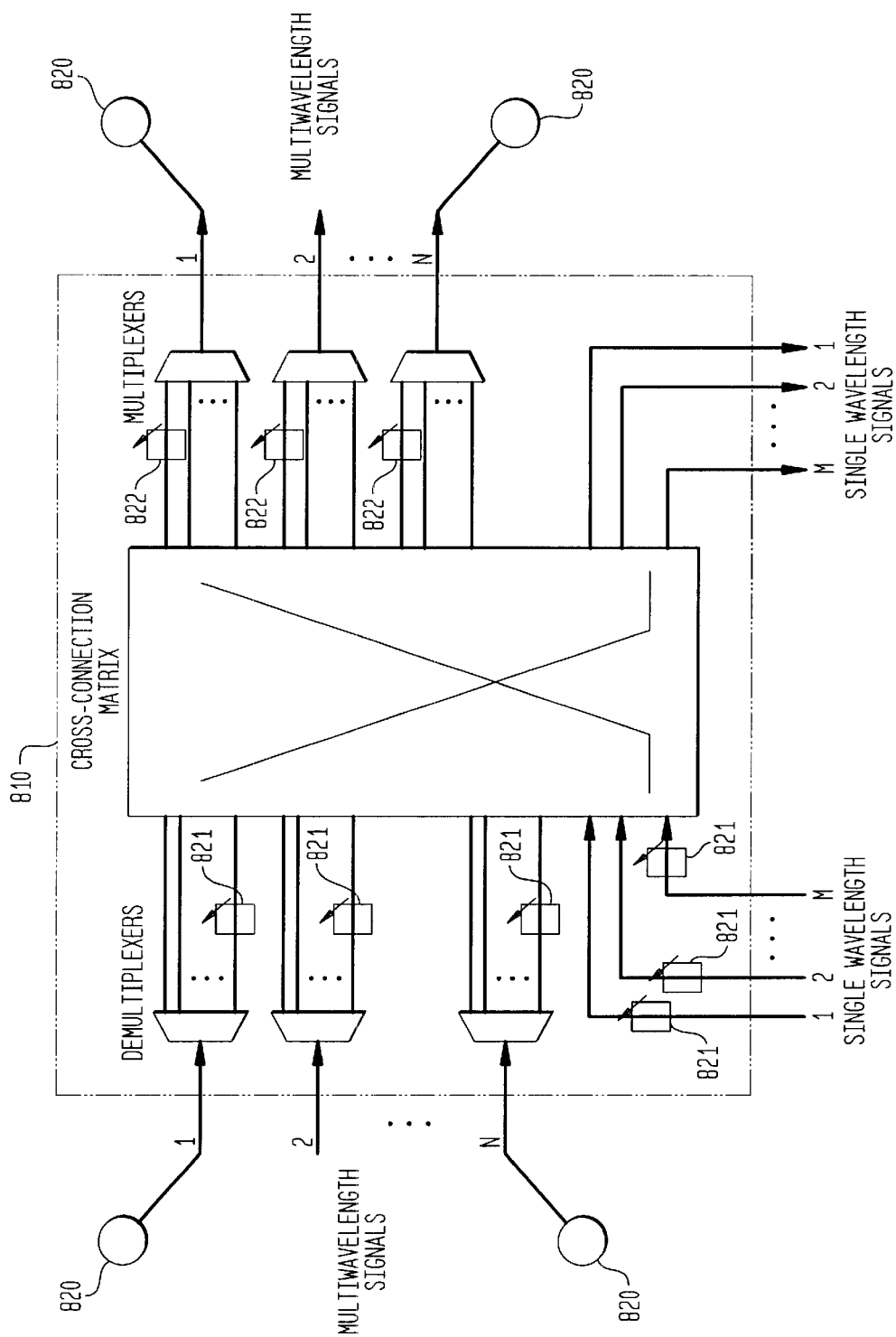

METHOD AND SYSTEM FOR SECURING WAVELENGTH DIVISION MULTIPLEX SYSTEMS

RELATED APPLICATIONS

The priority date for this Utility Patent Application is established by Provisional Patent Application No. 60/108,127, for which the filing date was Nov. 12, 1998 and the application was entitled "Method and System for Securing Wavelength Division Multiplex Systems".

FIELD OF THE INVENTION

This invention relates to Dense Wavelength Multiplex Systems (DWDMs) and specifically to securing information or channels in these systems.

BACKGROUND OF THE INVENTION

Dense Wavelength Division Multiplex (DWDM) technology has provided a cost-effective solution to fiber exhaust in communications networks by increasing the data throughput of the network without requiring the installation of new fiber and is the enabling technology for the emerging all optical networking. In a DWDM system each of several input signals enter a DWDM node or network element and is assigned or converted to a specific wavelength, typically, in the 1550 nanometer (nm) band. After wavelength conversion each individual signal wavelength or channel is then multiplexed by wavelength division multiplexing and transmitted onto the same fiber. Consequently, a single fiber carries more than one wavelength. In fact each wavelength carried by a DWDM system may be considered a virtual fiber.

In order for DWDM technology to be truly viable as a network solution, DWDM systems must be secure. As opposed to re al fibers, the signal carried on the virtual fibers of DWDM systems may be susceptible to eavesdropping. In DWDM systems different channels travel through the same fiber and the same components. As a result of cross-talk, nonlinearity, etc., at the receiving end, there is a residual of signal(s) from other channels that can be isolated, amplified, and detected.

The potential for eavesdropping may be better appreciated by reference to FIG.1 where there is depicted a receiving node 100 in a DWDM network. Receiving node 100 may be an optical demultiplexer or add drop multiplexer, a wavelength converter, or an optical cross-connect that serves as a drop off or interchange point for one or more channels. FIG. 2 shows, on a logarithmic scale, the optical spectrum of channel 10 in FIG. 1 as it dropped from node 100. As FIG. 2 shows, although the goal was to drop only channel 10, channel 11 is clearly visible. In FIG. 3, I used a notch filter to reduce the optical signal to noise ratio (OSNR) for channel 10. As FIG. 3 shows, channel 11 is still present with enough power to be recoverable. In fact, in FIG. 4, I have turned off the channel 10 transmitter and as FIG. 4 shows there is a significant amount of residual power still present from channel 11. I have also achieved similar results shown in FIG. 4 by introducing a second filter to attenuate channel 10 in the received spectrum. In either case, in FIG. 4, channel 11 is leaked with large enough OSNR to be recoverable after optical amplification. I have achieved better than 20 dB OSNR for the leaked signal for this particular optically amplified DWDM system. I expect better eavesdropping performance (larger OSNR than 20 dB for the leaked signal) for DWDM systems without the amplified stimulated emission (ASE) associated with the optical amplification process. Accordingly, the user of channel of 10 may be able to recover channel 11 without the network operator ever knowing of the breach in security. On another level, residual power from each channel may be available on all the channels thereby providing for security akin to having a party line.

Of utility then would be a method and system for securing DWDM networks against potential eavesdropping.

SUMMARY OF THE INVENTION

My invention is a method and system for securing DWDM networks by introducing noise into the fiber channel or cable up to the level of cross-talk (leakage) or ASE noise, which ever is larger, so that unauthorized recovery of channels is prevented or not permitted.

In accordance with my invention, a white noise source inputs white noise into the fiber channel up to amplified spontaneous emission level so that only the signal intended to be dropped or terminated can be recovered. In accordance with my invention the added noise masks the leaked signal without affecting the performance of the channel intended to be dropped or terminated.

By using only a noise source the network is secured against eavesdropping without the need of any sophisticated monitoring or processing software. Accordingly, a DWDM system designed in accordance with my invention will not incur a substantial increase in cost.

In one aspect of my invention the noise source is included as part of the DWDM node at the point the multiwavelength signal is being received, i.e., at the point within the equipment before the multiwavelength signal is optically demultiplexed. Although the noise can be injected anywhere along the path of the multiwavelength signals, it is most effective if injected at the receiving end.

In another aspect of my invention the noise source is coupled onto the fiber after the optical demultiplexer and just before the single channel optical signal is being handed over. In this case only the channels that have to be secure get the noise injection. In accordance with this aspect of my invention, DWDM systems that have been already deployed may be protected by my invention.

BRIEF DESCRIPTION OF THE DRAWINGS

FIG. 1 illustratively depicts a receiving node in a DWDM network;

FIG. 2 is a spectral plot of a received channel that is dropped from the DWDM node of FIG. 1, channel 11 appears as cross-talk in the spectral plot of FIG. 2;

FIG. 8 illustratively depicts an optical cross-connect node in a multiwavelength network implemented in accordance with my invention.

DETAILED DESCRIPTION OF THE INVENTION

Figure 6:
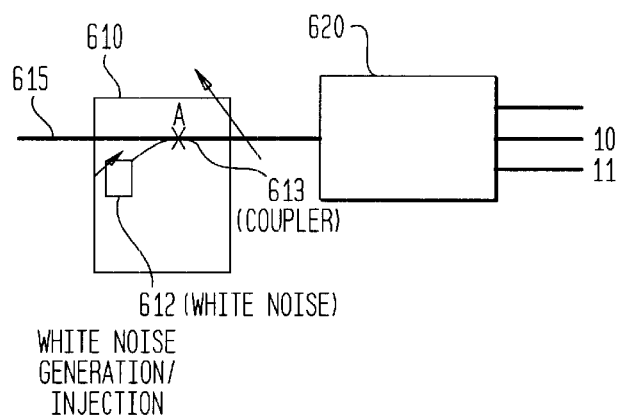
FIG. 6 illustratively depicts a node in a secure DWDM network designed in accordance with an aspect of my invention.

Turning now to FIG. 6, there is illustratively depicted a receiving node in a DWDM network that is dropping signals. In accordance with my invention a white noise source 610 may be placed at some point before a DWDM receiving node 620 as depicted in FIG. 6. The white noise source 610 includes a white noise generator 612 and coupler 613. In accordance with this aspect of my invention white noise is added to all the channels on fiber 615 at approximately detail A by the same source 610 or, specifically, by white noise generator 612.

Figure 3:
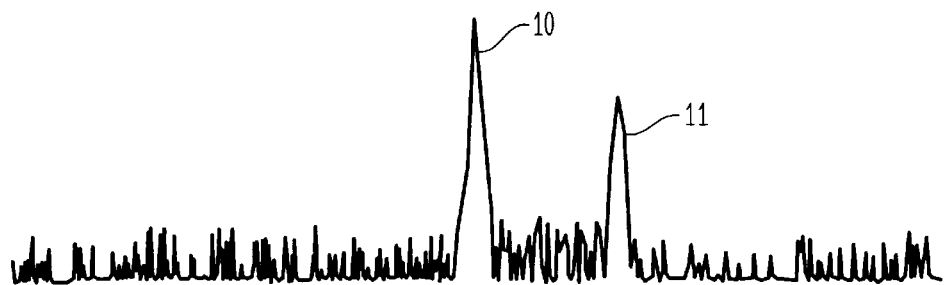
FIG. 3 is a spectral plot of the spectrum in FIG. 2 after filtering.
Figure 4:
FIG. 4 depicts the leaked channel after channel 10 in FIG. 3 is turned off or after a second filter is applied to FIG. 3.
Figure 5:
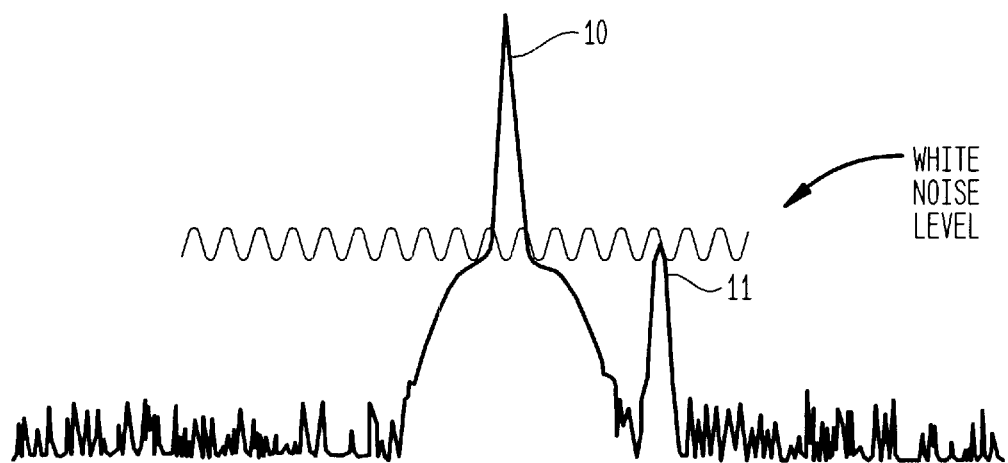
FIG. 5 depicts the optical spectrum of the dropped channel with white noise added in accordance with my invention.

The spectrum that results on channel 10 is illustratively shown in FIG. 5. As FIG. 5 shows, white noise is added only up to the amplified spontaneous emission level of the amplifiers deployed in the system. As FIG. 5 also shows, the added noise masks channel 11 while allowing recovery of channel 10. Note also that although FIG. 5 clearly shows channel 11, on an actual oscilloscope trace channel 11 would not at all be identifiable, i.e., it's presence is not detectable at channel 10. Accordingly, the intended recipient or carrier of channel 10 is not able to recover channel 11. Therefore, a DWDM system employing my invention in this manner allows the network operator to provide security. As such, by my invention DWDM systems already deployed can be secured by the network provider without any redesign or reengineering of these systems. This is the case because the noise or security code is added to fiber 615 at detail A either before or after the signal or information is internal to DWDM node or supplier equipment 620 and not in the node or any supplier equipment.

Figure 7:
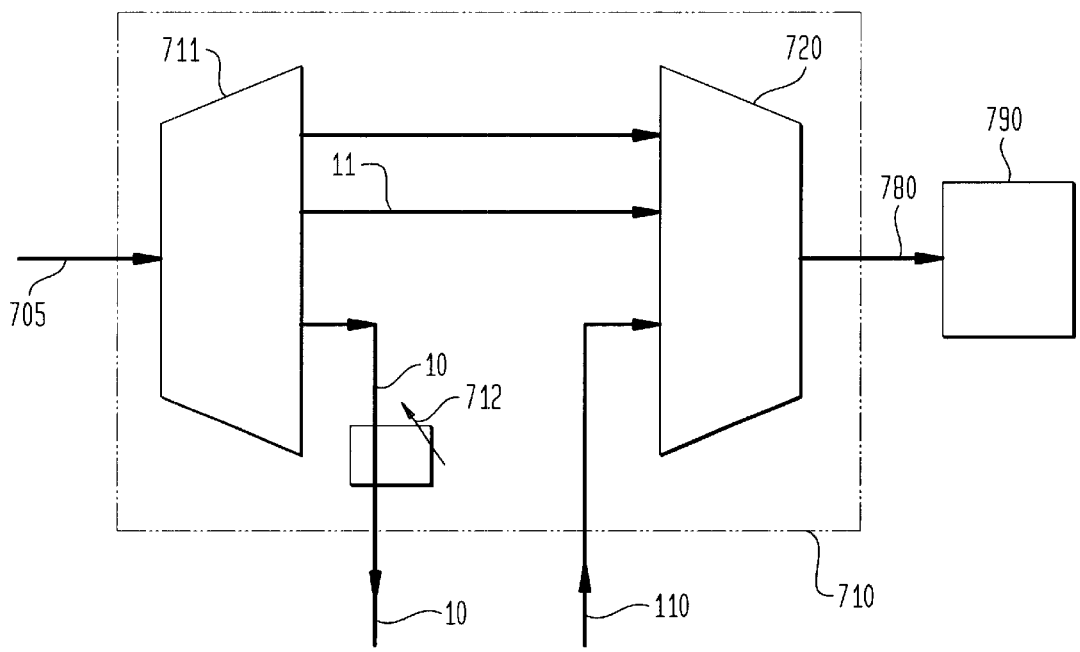
FIG. 7 illustratively depicts a secure DWDM network in accordance with another aspect of my invention.

In accordance with another aspect of my invention, white noise may be coupled only onto the channels being dropped before those signals are handed off to another carrier or a customer. Tuning now to FIG. 7, there is depicted a secure WDM node 710 of a DWDM system designed in accordance with this aspect of my invention. In FIG. 7, incoming signals on fiber span 705 are demultiplexed at WDM node 710 by optical demultiplexer 711. One of the signals that is demultiplexed is dropped at node 710 and is illustratively depicted as signal or channel 10. Typically, optical signal or channel 10 is handed over to another carrier. As can be seen by reference to FIG. 2 when channel 10 is dropped, other channels, such as channel 11, are leaked, thereby allowing for eavesdropping. However, in accordance with this aspect of my invention, noise generator 712 residing in node 710 injects white noise onto the dropped signal of channel 10 after the signal is demultiplexed by demultiplexer 711 but before channel 10 exits node 710. Accordingly, the spectrum shown in FIG. 5 results. In the absence of my invention the intended recipient or carrier of channel 10 has access to the signal leaked from channel 11. That leaked signal can be filtered, optically amplified, and recovered using conventional techniques. In addition to masking the leaked residual signal from channel 11, noise generator 712 can also mask a residual signal that is the result of nonlinear optical coupling. The particular application of my invention depicted in FIG. 7 may be particularly advantageous in scenarios where the owner of node 710 is precluded from adding noise generator 712 to fiber 705 owing to regulatory considerations.

At node 710 the inverse operation to demultiplexing may also take place. That is, signal 110 enters node 710 so as to be multiplexed and transmitted to node 790. At node 710 the multiplexing operation is carried out by wavelength division multiplexer 720. The multiplexed signal from multiplexer 720 is then coupled on fiber span 780 for transmission to node 790. At node 790 an operation similar to that which took place at node 710 also occurs, i.e., signals are added and dropped as required by customers. As such, by addition of a noise source in accordance with my invention only the channels intended to be dropped are decipherable by their respective recipient. Accordingly, by my invention a low cost solution is provided which prevents eavesdropping in DWDM networks.

My security method is also particularly advantageous in optical-cross connect nodes of a multiwavelength optical network because security can be done where it is most convenient. For example, and with reference to FIG. 8, an optical cross-connect 810 that is being used to groom traffic from several DWDM nodes 820 may also be used to secure traffic to and from the nodes 820. Specifically, after the signals are de-multiplexed in cross-connect 810 a white noise generator 821 injects noise onto the signal up to the ASE level. Although FIG. 8 illustratively depicts the placement of noise generator 821 after the incoming signals to cross-connect 810 are de-multiplexed, the addition of noise may also be done right at the input of the cross-connect multiplexers. This implementation is depicted by the placement of noise generator 822 in FIG. 8. As discussed above the signal or information would Although the above description is directed to DWDM systems, i.e., systems having optical amplifiers, my invention is also applicable to systems not having optical amplifiers. In those systems, noise would be added only up to the level necessary to mask leaked channels.

The above description is exemplary of my invention. Numerous modifications and variations may be made by those skilled in the art without departing from the scope and spirit of my invention.

What is claimed is:

1. An optical communications system in which first and second virtual fibers are associated with first and second carrier wavelengths in a single optical fiber as a multiplexed signal, said system including:

a demultiplexing node for accepting as input said multiplexed signal, and for separating from same a signal associated with said first carrier wavelength as an output to be dropped or further transmitted; and a noise generator for adding a predetermined noise level signal wherein said noise level signal masks a residual signal associated with said second carrier wavelength but does not affect the signal associated with the first carrier wavelength or a signal associated with the second carrier wavelength.

2. An optical communications system as defined in claim 1 in which said noise generator generates white noise.

3. An optical communications system as defined in claim 1 in which the predetermined noise level is approximately equal to the signal coupled from said second carrier wavelength signal.

4. An optical communications system as defined in claim 1 in which said noise generator adds noise to the multiplexed input signal.

5. An optical communications system as defined in claim 1 in which said noise generator adds noise to the demultiplexed output signal associated with said first carrier wavelength.

6. An optical communications system as defined in claim 1 in which the signal associated with said second carrier wavelength is also separated from the multiplexed signal by the demultiplexing node as an output to be further transmitted, and said noise level signal masks a residual signal associated with said carrier wavelength.

7. A method for securing an optical communication system having a plurality of wavelengths, each wavelength within the plurality of wavelengths representing a channel in the system, the system including a demultiplexing node with a plurality of drop fiber cables, said method comprising the step of introducing noise into at least one of the fiber cables to mask a residual of each of the channels that appears on the at least one fiber cable so that only the channel intended to be dropped on the at least one fiber cable can be recovered.

8. The method in accordance with claim 7 wherein said step of introducing noise comprises the substep of coupling white noise onto the fiber cable up to the amplified spontaneous emission level on the fiber cable.

9. A node for demultiplexing and securing wavelengths from a plurality of wavelengths, the node comprising:
   a demultiplexer,
   a plurality of drop fiber cables connected to the output of said demultiplexer, and
   a noise source connected to at least one of the fiber cables to mask a residual of each of the wavelengths that may appear on the at least one fiber cable so that only the channel intended to be dropped on the at least one fiber cable can be recovered.

* * * * *

UNITED STATES PATENT AND TRADEMARK OFFICE
CERTIFICATE OF CORRECTION

PATENT NO. : 6,404,524 B1
DATED : June 11, 2002
INVENTOR(S) : Shahab Etemad

It is certified that error appears in the above-identified patent and that said Letters Patent is hereby corrected as shown below:

Column 4,
Line 53, after "equal to the" insert -- residual --.

Signed and Sealed this

Twenty-second Day of November, 2005

JON W. DUDAS
*Director of the United States Patent and Trademark Office*